United States Patent
Mendonsa et al.

(10) Patent No.: US 10,811,045 B2
(45) Date of Patent: Oct. 20, 2020

(54) ASSEMBLY THAT ENABLES REDUCTION IN DISK TO DISK SPACING

(71) Applicant: Seagate Technology LLC, Cupertino, CA (US)

(72) Inventors: Riyan Alex Mendonsa, Edina, MN (US); Edward Charles Gage, Lakeville, MN (US); Kevin Gomez, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/965,097

(22) Filed: Apr. 27, 2018

(65) Prior Publication Data

US 2019/0333533 A1    Oct. 31, 2019

(51) Int. Cl.
| | |
|---|---|
| *G11B 5/54* | (2006.01) |
| *G11B 5/48* | (2006.01) |
| *G11B 5/55* | (2006.01) |
| *G11B 5/012* | (2006.01) |

(52) U.S. Cl.
CPC ............ *G11B 5/5573* (2013.01); *G11B 5/012* (2013.01); *G11B 5/4813* (2013.01); *G11B 5/4826* (2013.01); *G11B 2220/2508* (2013.01)

(58) Field of Classification Search
CPC ... G11B 5/4813; G11B 5/5531; G11B 25/043; G11B 5/484; G11B 5/4826; G11B 5/4833; G11B 5/54; G11B 5/5521; G11B 17/021; G11B 5/56; G11B 21/12; G11B 21/22

USPC ......... 360/265.9, 98.01, 266.5, 78.12, 246.2, 360/266.1, 234.7, 244.5, 245.1, 267.9; 711/112, 103, 157

See application file for complete search history.

(56) References Cited

U.S. PATENT DOCUMENTS

| | | |
|---|---|---|
| 3,311,902 A | 3/1967 | Appleton |
| 3,940,794 A | 2/1976 | Griffiths et al. |
| 4,164,767 A | 8/1979 | Gyi et al. |
| 4,208,685 A | 6/1980 | Matla et al. |
| 4,566,087 A | 1/1986 | Kraft |
| 4,742,410 A | 5/1988 | Smith |
| 4,839,756 A | 6/1989 | Chew et al. |
| 4,884,261 A | 11/1989 | Dalziel |
| 4,888,751 A * | 12/1989 | Yoshimaru ........... G11B 7/0037 369/30.58 |
| 5,023,737 A | 6/1991 | Yaeger |

(Continued)

FOREIGN PATENT DOCUMENTS

WO    2020018854 A1    1/2020

OTHER PUBLICATIONS

World's first commercial Hard Drive—IBM 350 (RAMAC); https://www.youtube.com/watch?v=aTkL4FQL2Fl; Nov. 27, 2016; 5 pages.

(Continued)

*Primary Examiner* — Nabil Z Hindi

(74) *Attorney, Agent, or Firm* — Westman, Champlin & Koehler, P.A.

(57) ABSTRACT

An apparatus includes a plurality of storage media mounted on a rotatable spindle. The apparatus also includes an actuator with at least one actuator arm configured to translate among the plurality of storage media and at least two heads supported on the at least one actuator arm. Each of the at least two heads is configured to communicate with the plurality of storage media.

6 Claims, 8 Drawing Sheets

(56) References Cited

U.S. PATENT DOCUMENTS

| | | | |
|---|---|---|---|
| 5,283,705 | A | 2/1994 | Iwabuchi |
| 5,293,282 | A | 3/1994 | Squires et al. |
| 5,307,224 | A | 4/1994 | Minase |
| 5,341,260 | A | 8/1994 | Jabbari |
| 5,343,347 | A | 8/1994 | Gilovich |
| 5,347,414 | A | 9/1994 | Kano |
| 5,459,921 | A | 10/1995 | Hudson et al. |
| 5,467,238 | A | 11/1995 | Lee et al. |
| 5,550,695 | A | 8/1996 | Matsumoto |
| 5,764,437 | A | 6/1998 | Meyer et al. |
| 5,831,795 | A | 11/1998 | Ma et al. |
| 5,973,886 | A | 10/1999 | Khuu |
| 5,973,887 | A | 10/1999 | Cameron |
| 5,995,332 | A | 11/1999 | Patterson |
| 5,999,351 | A * | 12/1999 | Albrecht .............. G11B 21/083 360/48 |
| 6,005,747 | A | 12/1999 | Gilovich |
| 6,055,134 | A | 4/2000 | Boutaghou |
| 6,067,208 | A | 5/2000 | Segar |
| 6,081,399 | A | 6/2000 | Lee et al. |
| 6,091,576 | A | 7/2000 | Eckerd et al. |
| 6,122,130 | A | 9/2000 | Boutaghou et al. |
| 6,134,076 | A | 10/2000 | Boutaghou et al. |
| 6,157,520 | A | 12/2000 | Mangold et al. |
| 6,160,686 | A | 12/2000 | Albrecht et al. |
| 6,201,666 | B1 | 3/2001 | Resh |
| 6,275,356 | B1 | 8/2001 | Boutaghou et al. |
| 6,278,584 | B1 | 8/2001 | Zhang et al. |
| 6,404,580 | B1 | 6/2002 | Fioravanti |
| 6,449,129 | B1 | 9/2002 | MacPherson et al. |
| 6,452,753 | B1 | 9/2002 | Hiller et al. |
| 6,473,270 | B1 | 10/2002 | McDonald et al. |
| 6,480,361 | B1 | 11/2002 | Patterson |
| 6,487,050 | B1 | 11/2002 | Liu |
| 6,490,135 | B1 | 12/2002 | Sannino et al. |
| 6,507,460 | B2 | 1/2003 | Fayeulle et al. |
| 6,519,115 | B1 | 2/2003 | Yaeger |
| 6,577,473 | B1 | 6/2003 | MacPherson et al. |
| 6,597,540 | B2 * | 7/2003 | Tsuda .................. G11B 5/49 360/265.9 |
| 6,621,651 | B1 | 9/2003 | Ratliff et al. |
| 6,650,506 | B1 | 11/2003 | Risse |
| 6,693,773 | B1 | 2/2004 | Sassine |
| 6,710,964 | B1 | 3/2004 | Rao et al. |
| 6,775,107 | B2 | 8/2004 | Kasajima et al. |
| 6,847,504 | B1 * | 1/2005 | Bennett .............. G11B 5/4833 360/77.02 |
| 6,855,282 | B2 | 2/2005 | Fayeulle et al. |
| 6,952,319 | B2 | 10/2005 | Weiehelt et al. |
| 6,989,965 | B2 | 1/2006 | Mundt et al. |
| 7,102,842 | B1 | 9/2006 | Howard |
| 7,385,781 | B1 | 6/2008 | Craig et al. |
| 7,548,399 | B2 | 6/2009 | Shin |
| 7,672,083 | B1 | 3/2010 | Yu et al. |
| 7,675,712 | B2 | 3/2010 | Liu et al. |
| 7,733,610 | B2 | 6/2010 | Scura et al. |
| 7,813,078 | B1 | 10/2010 | Gleason et al. |
| 7,848,057 | B1 | 12/2010 | Shukla |
| 7,986,491 | B2 | 7/2011 | Albrecht et al. |
| 8,024,853 | B2 | 9/2011 | Rivera |
| 8,035,913 | B2 | 10/2011 | Kim et al. |
| 8,112,580 | B2 * | 2/2012 | Bandic ................ G11B 5/5521 360/75 |
| 8,194,345 | B2 | 6/2012 | Kwon et al. |
| 8,208,215 | B2 | 6/2012 | Molaro et al. |
| 8,493,690 | B1 | 7/2013 | Ono et al. |
| 8,824,094 | B1 | 9/2014 | Furlong et al. |
| 8,873,200 | B2 | 10/2014 | Warn et al. |
| 8,958,172 | B1 | 2/2015 | Hansen |
| 8,958,173 | B1 * | 2/2015 | Hirano ................ G11B 25/043 360/98.01 |
| 9,025,277 | B1 | 5/2015 | Hirano |
| 9,171,560 | B1 | 10/2015 | Davidson et al. |
| 9,183,862 | B1 | 11/2015 | Shah et al. |
| 9,218,833 | B1 * | 12/2015 | Shah .................... G11B 21/22 |
| 9,449,649 | B1 | 9/2016 | Rejae et al. |
| 9,536,552 | B1 | 1/2017 | Chen et al. |
| 9,552,835 | B1 | 1/2017 | Tamayo et al. |
| 9,704,521 | B1 | 7/2017 | Shah et al. |
| 10,269,380 | B1 * | 4/2019 | Sun ..................... G11B 17/021 |
| 10,622,012 | B1 | 4/2020 | Tu et al. |
| 2005/0280945 | A1 | 12/2005 | Duvall et al. |
| 2005/0286171 | A1 | 12/2005 | Kim et al. |
| 2006/0002028 | A1 | 1/2006 | Nayar et al. |
| 2006/0117558 | A1 | 6/2006 | Koh et al. |
| 2006/0171078 | A1 | 8/2006 | Kajitani |
| 2006/0256478 | A1 | 11/2006 | Hayakawa |
| 2009/0279199 | A1 | 11/2009 | Zhang |
| 2010/0091408 | A1 | 4/2010 | Albrecht et al. |
| 2011/0038074 | A1 | 2/2011 | Viskochil et al. |
| 2012/0002328 | A1 | 1/2012 | Aoki et al. |
| 2012/0075750 | A1 | 3/2012 | Chan et al. |
| 2014/0126084 | A1 | 5/2014 | Nakamiya et al. |
| 2019/0333533 | A1 | 10/2019 | Mendonsa |
| 2020/0027477 | A1 | 1/2020 | Garbarino |
| 2020/0027480 | A1 | 1/2020 | Myers et al. |

OTHER PUBLICATIONS

Restriction Requirement for U.S. Appl. No. 15/946,859, dated May 19, 2020, 8 pages.
Application and Drawings for U.S. Appl. No. 16/805,174, filed Feb. 28, 2020, 40 pages.
Application and Drawings for U.S. Appl. No. 16/863,287, filed Apr. 30, 2020, 22 pages.
Prior Art Database Technical Disclosure, IP.com No. IPCOM000228512D, "Retracting Load/Unload Ramp", https://ip.com/IPCOM/000228512, dated Jun. 14, 2013, 6 pages.
Maplesoft Application Brief, "Optimal Control Design of a Voice Coil Head Actuator in a Hard Drive", www.maplesoft.com/appsbriefs, dated 2008, 30 pages.

* cited by examiner

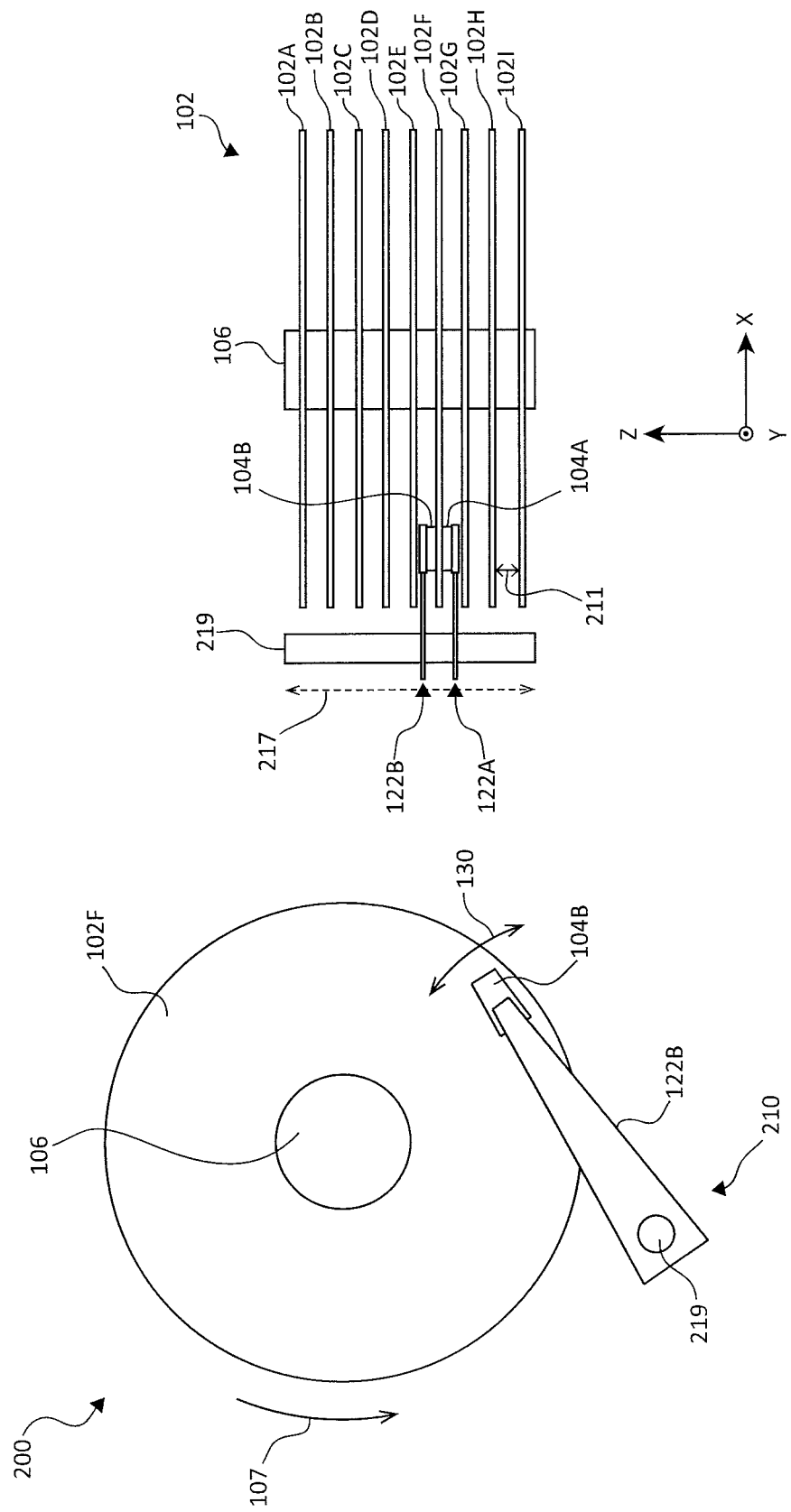

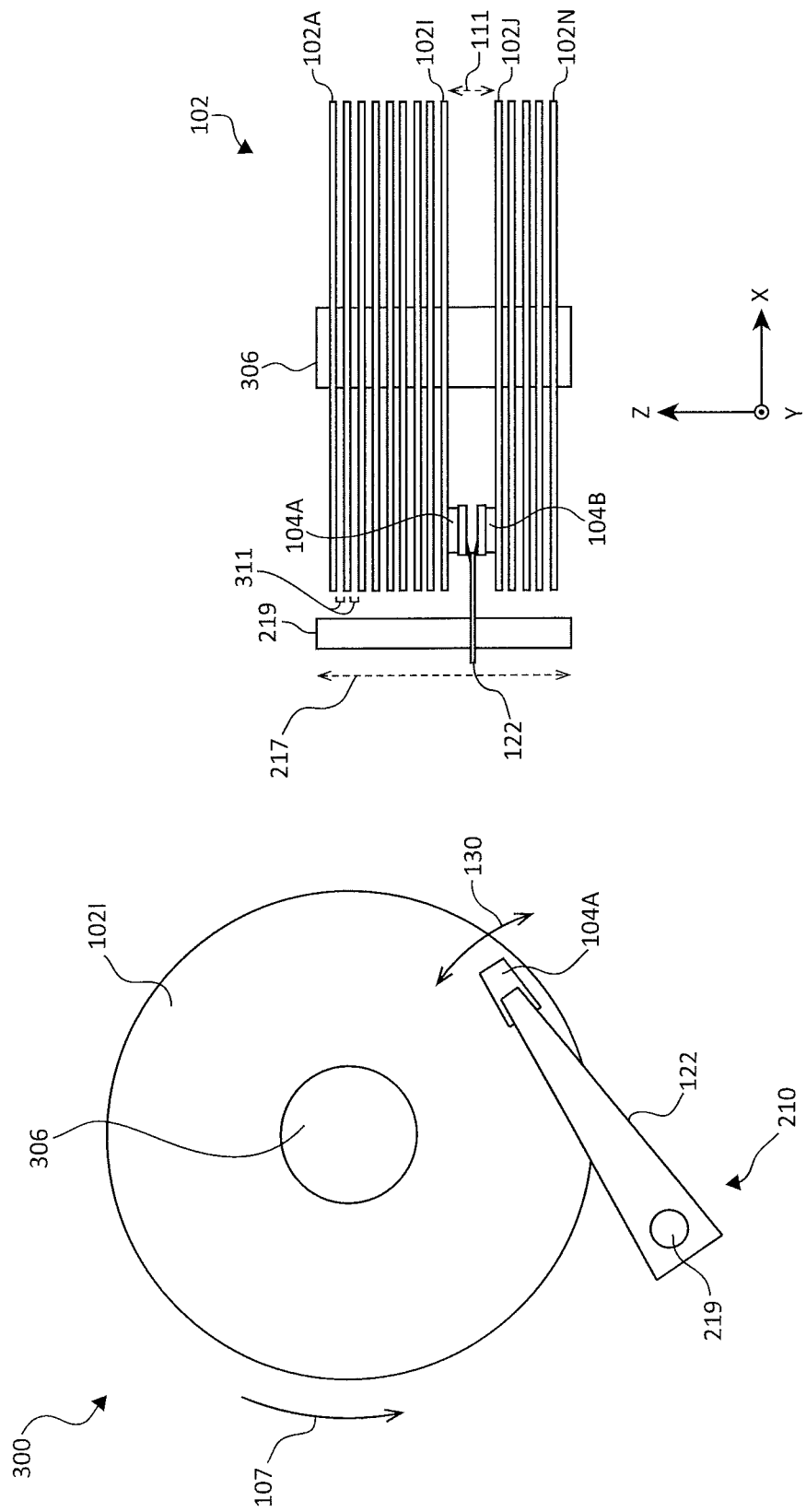

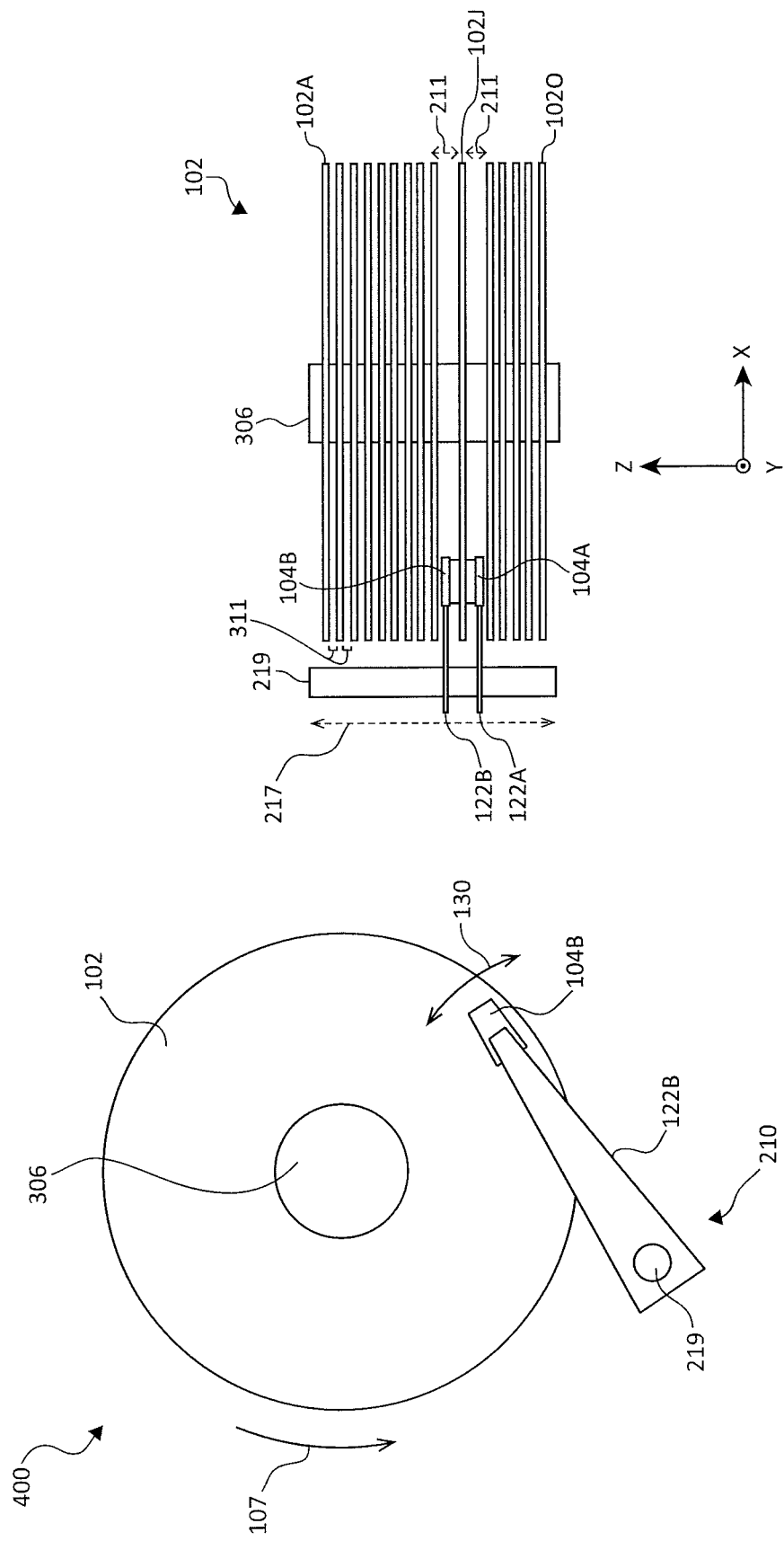

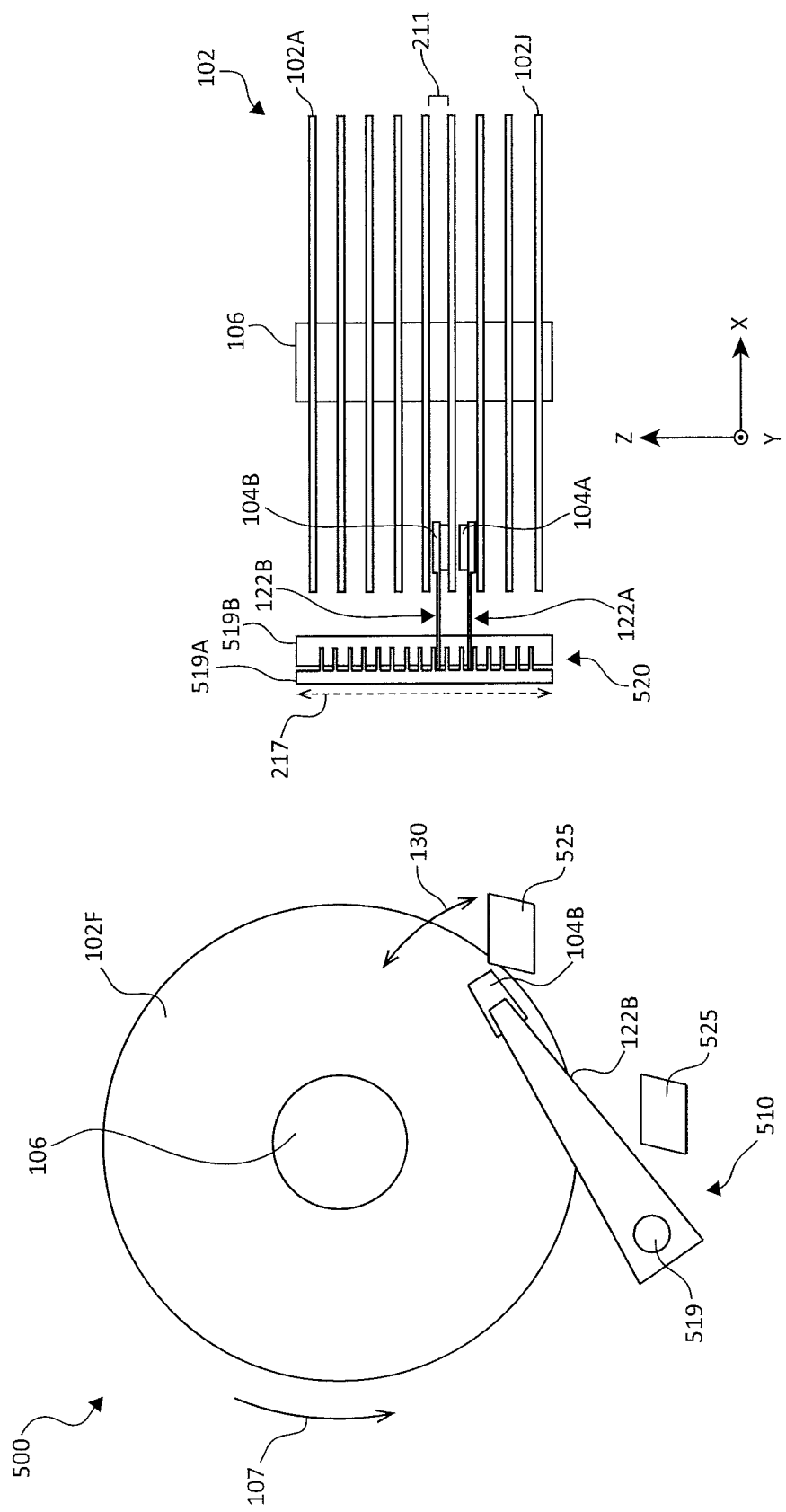

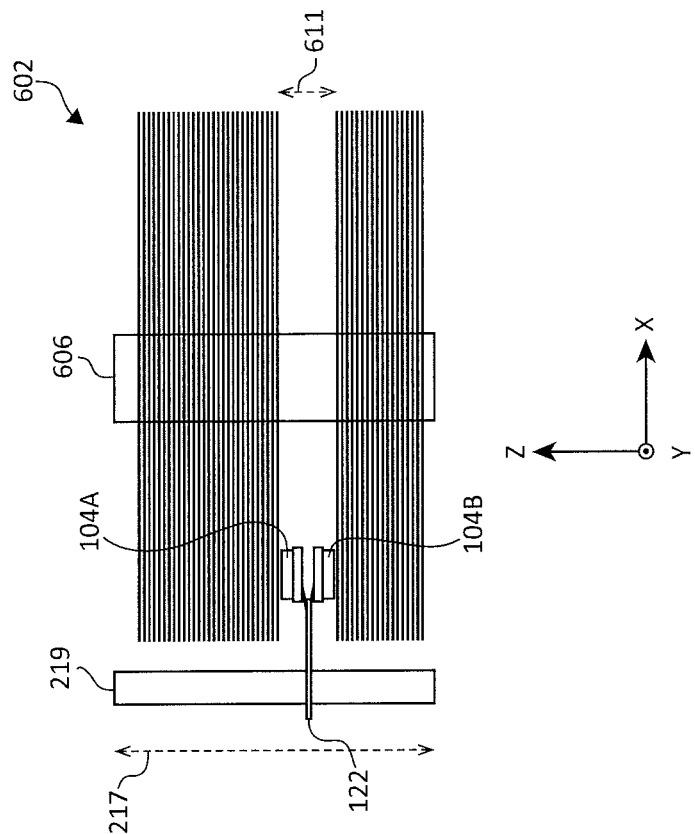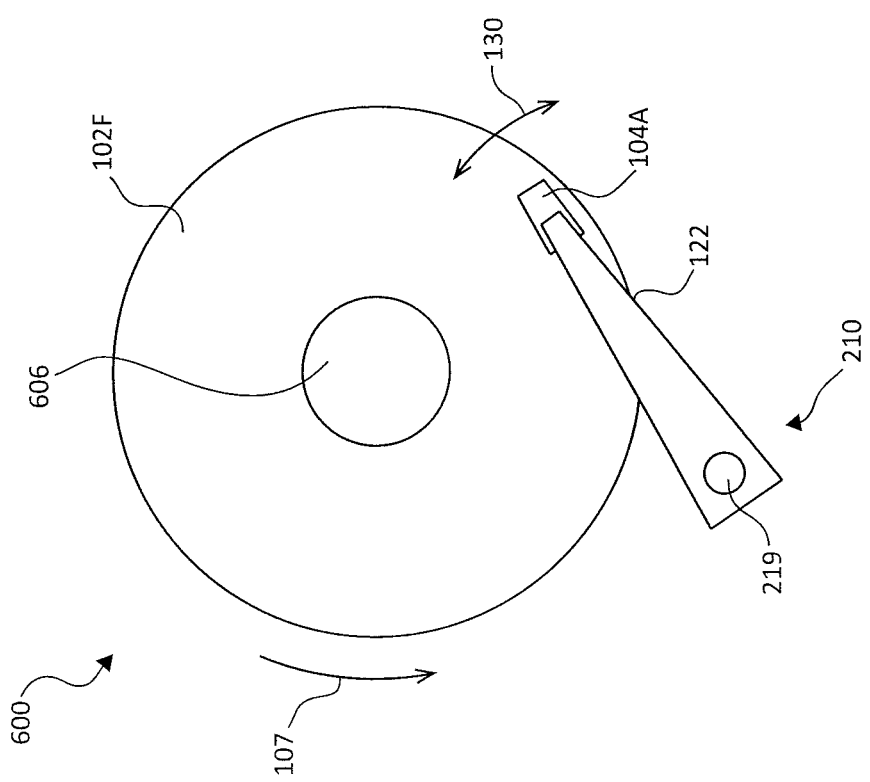

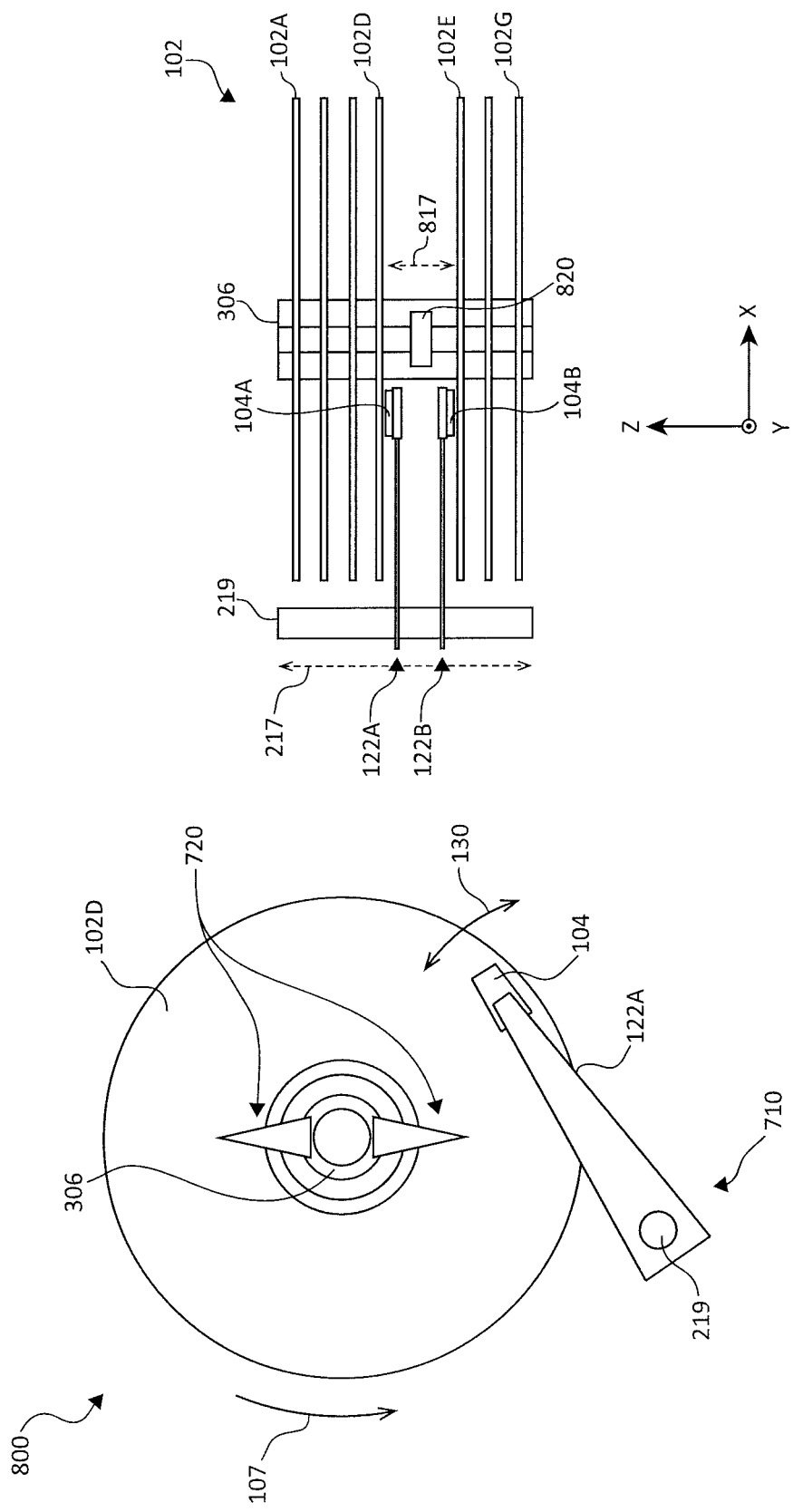

ASSEMBLY THAT ENABLES REDUCTION IN DISK TO DISK SPACING

SUMMARY

In one embodiment, an apparatus includes a plurality of storage media mounted on a rotatable spindle. The apparatus also includes an actuator mechanism with at least one actuator arm configured to translate among the plurality of storage media and at least two heads supported on the at least one actuator arm. Each of the at least two heads is configured to communicate with the plurality of storage media.

In another embodiment, an apparatus includes a plurality of storage media mounted on a spindle. The apparatus also includes at least one actuator with an actuator arm configured to translate vertically among the plurality of storage media, and at least one head supported on the actuator arm. The at least one head is configured to communicate with multiple ones of the plurality of storage media.

In yet another embodiment, a method is provided. The method includes providing a plurality of storage media mounted on a rotatable spindle. The method also includes providing an actuator mechanism having an actuator arm supporting a head. The actuator arm is capable of translating vertically among the plurality of storage media.

Other features and benefits that characterize embodiments of the disclosure will be apparent upon reading the following detailed description and review of the associated drawings.

BRIEF DESCRIPTION OF THE DRAWINGS

FIGS. 2A and 2B are schematic illustrations of a data storage device according to an embodiment of the disclosure.

FIGS. 3A and 3B are schematic illustrations of a data storage device according to an embodiment of the disclosure.

FIGS. 4A and 4B are schematic illustrations of a data storage device according to an embodiment of the disclosure.

FIGS. 5A and 5B are schematic illustrations of a data storage device according to an embodiment of the disclosure.

FIGS. 6A and 6B are schematic illustrations of a data storage device according to an embodiment of the disclosure.

FIGS. 8A and 8B are schematic illustrations of a data storage device according to an embodiment of the disclosure.

DETAILED DESCRIPTION

Although the present disclosure has been described with reference to embodiments, workers skilled in the art will recognize that changes may be made in form and detail without departing from the scope of the disclosure. The present disclosure relates to reducing disk to disk spacing in data storage devices by using heads vertically translatable among a plurality of disks in a disk drive. However, prior to providing additional detail regarding the different embodiments, a description of an illustrative operating environment is provided.

Figure 1B:
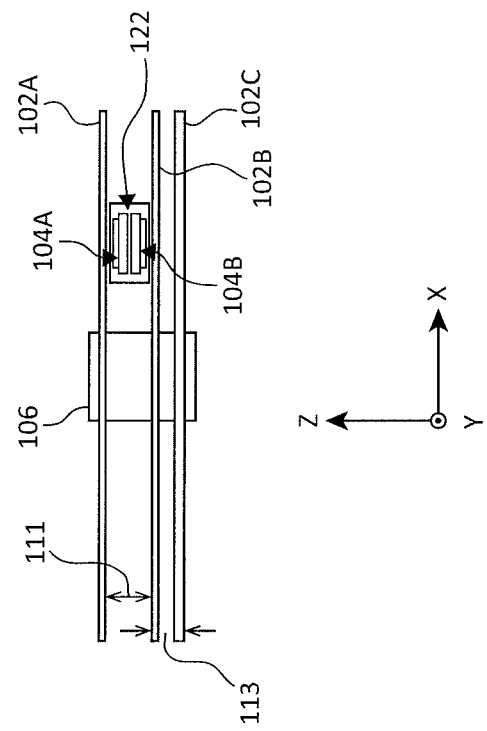
FIGS. 1A and 1B illustrate an example of a data storage device in which embodiments of the present application can be used.
Figure 1A:
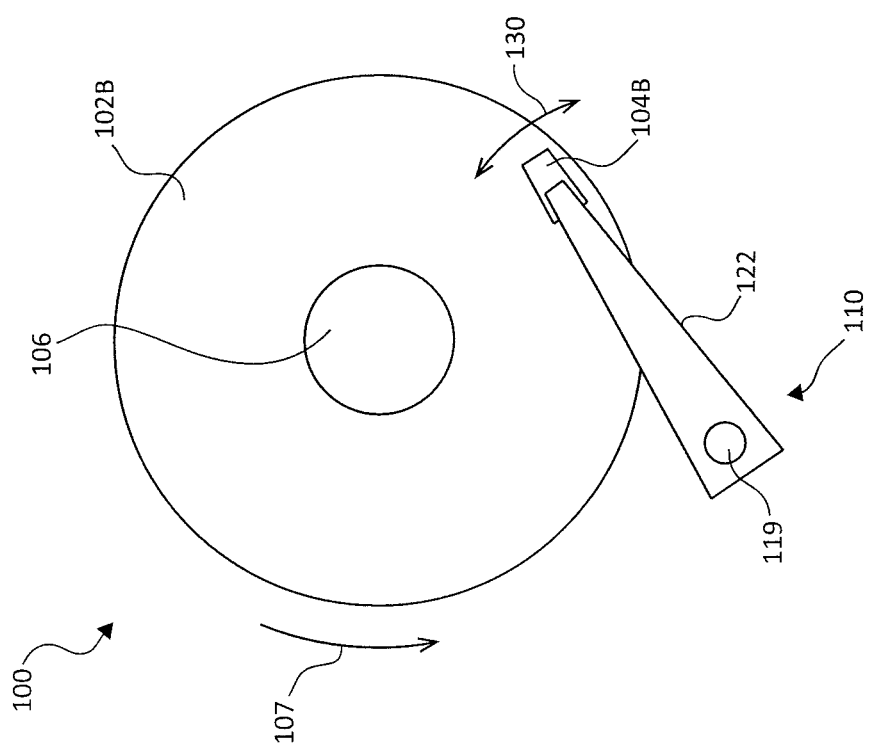

FIGS. 1A and 1B show an illustrative operating environment in which certain data storage device embodiments disclosed herein may be incorporated. The operating environment shown in FIGS. 1A and 1B is for illustration purposes. Embodiments of the present disclosure are not limited to any particular operating environment such as the operating environment shown in FIGS. 1A and 1B. Embodiments of the present disclosure are illustratively practiced within any number of different types of operating environments.

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIGS. 1A and 1B are schematic illustrations of a data storage device (e.g., a hard disk drive or HDD) 100 including data storage media or disks 102A and 102B, heads 104A and 104B for reading data from and/or writing data to the data storage media, and an actuator mechanism to position the heads 104A and 104B. FIG. 1A illustrates a top view of a portion of data storage device 100 and includes lower data storage material, or storage media 102B, e.g., second recording disk 102B and a down or downward-facing head 104B. The down head 104B including transducer elements (not shown) is positioned above the data storage media 102B to read data from and/or write data to the disk 102B. In the embodiment shown, the disk 102B represents a rotatable disk or other storage media that include one or more magnetic, optical or other storage layers. For read and write operations, a spindle motor 106 rotates the media 102B (and medium 102A shown in FIG. 1B) as illustrated by arrow 107 and an actuator mechanism 110 positions the down head 104B relative to data tracks on the disk 102B. The head 104B is coupled to an arm 122 of the actuator mechanism 110. In the interest of simplification, arm 122 is shown as a single element to which head 104B is coupled. However, in some embodiments, head 104B may be coupled to actuator mechanism 110 through a suspension assembly (not shown) which may include a load beam (not shown) coupled to actuator arm 122 of the actuator mechanism 110, for example through a swage connection. Although FIG. 1A illustrates a single arm 122 coupled to the actuator mechanism 110, additional arms 122 can be coupled to the actuator mechanism 110 to support heads that read data from or write data to multiple disks of a disk stack. The actuator mechanism 110 is rotationally coupled to a frame or deck (not shown) to rotate about a pivot shaft 119. Rotation of the actuator mechanism 110 moves the head 104B in a cross-track direction as illustrated by arrow 130 and enables movement between an inner diameter (ID) and an outer diameter (OD) of the disk.

FIG. 1B illustrates a side view of the data storage device 100. FIG. 1B illustrates first or upper disk 102A and second or lower disk 102B coupled to spindle motor 106 and separated by a disk to disk space 111. FIG. 1B further illustrates up head 104A coupled to actuator arm 122 facing upwards towards the bottom surface of the first disk 102A, and down head 104B (also shown in FIG. 1A) facing downwards towards the top surface of the second disk 102B. In some embodiments, heads 104A and 104B may be coupled to actuator arm 122 by a load beam. The heads 104A and 104B may be moved by actuator mechanism 110. Up head 104A may read data from and/or write data to the storage material on the bottom of disk 102A, and down head 104B may read data from and/or write data to the storage material on the top of disk 102B.

As data storage increases, the volumetric density of data storage devices becomes an ever-greater concern when compared to areal density. One method of increasing volumetric density in an HDD involves reducing the disk to disk spacing between the data storage media or disks. Reducing disk to disk spacing may enable an increased number of disks to be stacked within a similar disk stack volume.

This disclosure generally describes apparatus and methods of decreasing the disk to disk spacing by using a fewer heads than disks in the data storage device. In such embodiments, a same head or two heads may read from and/or write to different disks at different times. A separation distance between disk or disk surfaces that are not being currently read from or written to may be relatively small (e.g., 113 between disks 102B and 102C). To accommodate the same head or the two heads for a read/write operation, a spacing between two disks may be temporarily increased to, for example, 111 in FIG. 1B. As will be described in detail further below, in such embodiments, an actuator mechanism with a single head or two heads including an up head and a down head are provided with the ability to move up and down on the Z axis to different disks in the disk stack. By utilizing a single set of heads with the ability to move up and down the Z axis to different disks in a stack, the volume of the disk stack and the cost for heads is reduced. Reducing the disk to disk spacing increases the volumetric density and therefore disk to disk space may be saved. This volumetric density has the potential to convert, for example, a current eight-disk design into an eleven-disk design within the same form factor.

FIGS. 2A and 2B are schematic illustrations of a data storage device 200 that employs two heads, including an up head and a down head which may be vertically translated on the Z axis between a plurality of disks according to an embodiment of the disclosure. FIGS. 2A and 2B incorporate similar elements from FIGS. 1A and 1B, such that FIG. 2A illustrates a top view of a portion of data storage device 200 and includes data storage medium or disk 102F and down head 104B.

In the embodiment shown, the down head 104B and up head 104A (seen in FIG. 2B) are provided on an actuator mechanism 210 to position the heads 104A and 104B relative to the data tracks on disk 102F. Up head 104A is coupled to actuator arm 122A and down head 104B is coupled to actuator arm 122B. The heads 104A and 104B may also be coupled to the actuator mechanism 210 through a suspension assembly which may include a load beam (not shown) coupled to actuator arm 122A, 122B of the actuator mechanism 210. Actuator arms 122A and 122B are mounted on pivot shaft 219, respectively, to provide rotation in a cross-track direction as illustrated by arrow 130. Thus, for read and write operations, a spindle motor 106 rotates the disk 102F (as well as disks 102A-102I seen in FIG. 1B) as illustrated by arrow 107 and actuator mechanism 210 positions the heads 104A and 104B relative to data tracks on the disk 102F in a cross-track motion as illustrated by arrow 130.

FIG. 2B illustrates a side view of the data storage device 200. FIG. 2B illustrates a nine-disk stack with a first or topmost disk 102A, to a ninth or bottommost disk 102I coupled to spindle motor 106 and separated by disk to disk space 211. As can be seen, disk to disk space 211 provides disk separation allowing for a single head 104A, 104B between disks 102. Thus, disk to disk space 211 is smaller than disk to disk space 111 of FIG. 1B, which reduces disk to disk spacing on the Z axis in a disk stack overall. Although nine disks are illustrated in the disk stack, this is exemplary only, and a plurality of disks may be used in a data storage device according to the disclosure.

FIG. 2B further illustrates up head 104A on actuator arm 122A facing upwards towards the bottom surface of disk 102F and down head 104B on actuator arm 122B facing downwards towards the top surface of disk 102F. The heads 104A and 104B may be moved by actuator mechanism 210. Actuator arms 122A and 122B of heads 104A and 104B are coupled to pivot shaft 219 and may be translatable vertically along the Z axis as illustrated by arrow 217. Actuator mechanism 210, therefore, enables heads 104A and 104B to translate vertically in the Z axis, e.g., along arrow 217, to any disk 102 in a disk stack as well as to rotate in cross track motion along arrow 130.

Actuator mechanism 210 enables the arms 122A and 122B to rotate and translate to allow head 104A and 104B to communicate with the data storage material or storage media on any disk of a disk stack. For example, up head 104A may read data from and/or write data to the storage material on the bottom of disk 102A, and down head 104B may read data from and/or write data to the storage material on the top of disk 102A. This action may be carried out by first rotating heads 104A, 104B in a cross-track direction away from their current position by translating heads 104A, 104B until they are off their current disk, e.g., 102F. Then, actuator mechanism 210 may translate heads 104A and 104B vertically on the Z axis (as indicated by arrow 217) until they have reached the selected disk, e.g., 102A. Actuator mechanism 210 may then rotate heads 104A and 104B in a cross-track direction until heads 104A and 104B are in communication with the data storage material of disk 102A. Although FIGS. 2A and 2B illustrate a nine-disk stack, these illustrations are exemplary only, and a data storage device may be provided with a plurality of data storage media with reduced disk to disk spacing according to embodiments of the present disclosure.

FIGS. 3A and 3B are a schematic illustration of a data storage device 300 that employs a single set of up and down heads according to an embodiment of the disclosure. FIGS. 3A and 3B incorporate similar elements from FIGS. 2A and 2B, such that FIG. 3A illustrates a top view of a portion of a data storage device 300 and includes a data storage medium or disk 102 and an up head 104A.

FIGS. 3A and 3B illustrate an embodiment of the present disclosure wherein the disks 102 coupled to a spindle motor 306 may be translatable vertically along the Z axis as illustrated by arrow 217. Similarly, to FIGS. 1A and 1B, in FIG. 3B up head 104A and down head 104B are coupled to actuator arm 122 such that 104A faces upwards towards the bottom surface of a disk 102I, and down head 104B faces downwards towards the top surface of a disk 102J. Similar to FIGS. 2A and 2B, actuator arm 122 is coupled to pivot shaft 219 and may be translatable vertically along the Z axis as illustrated by arrow 217. Actuator mechanism 210, therefore, enables heads 104A and 104B to translate vertically along arrow 217 in the Z axis to any disk 102 in a disk stack as well as to rotate in cross track motion along arrow 130.

FIG. 3B illustrates an embodiment where data storage device 300 may further increase volumetric capacity by allowing disks 102 to translate vertically and decrease their relative disk spacing to a disk to disk spacing 311. Spindle motor 306 enables disks 102 to translate vertically along arrow 217 in the Z axis, such that disks 102 may increase or decrease their relative disk to disk spacing. Disk to disk spacing 311 may be less than disk to disk spacing 211 of FIG. 2B. Therefore, by employing a single set of up and down heads, heads 104A, 104B may occupy a disk to disk space 111, such as between disks 102I and 102J, and the remaining disks 102 of the disk stack may occupy a reduced disk to disk spacing 311.

Actuator mechanism 210 in cooperation with spindle motor 306 enables the heads 104A and 104B to communicate with the data storage material on any disk of a disk stack, while keeping a reduced disk to disk spacing 311. For example, if heads 104A and 104B are to read data from and/or write data to data storage material of a disk they are not currently aligned with, e.g., disk 102I or 102J, actuator mechanism 210 may rotate arm 122 in a cross-track motion by arrow 130 until heads 104A and 104B are off the disk. Disks 102 may then translate vertically on the Z axis (as indicated by arrow 217) on spindle 306 until disks 102 have opened a disk to disk spacing 311 to allow heads 104A and 104B to communicate with the appropriate data storage media. Actuator mechanism 210 may translate heads 104A, 104B vertically on the Z axis (as indicated by arrow 217) until they have reached the selected disk, and then rotate heads 104A and 104B in a cross-track direction until heads 104A and 104B are in communication with the appropriate data storage material.

Although FIGS. 3A and 3B illustrate a fourteen-disk stack, these illustrations are exemplary only, and a data storage device may be provided with a plurality of data storage media with the ability to provide reduced disk to disk spacing according to embodiments of the disclosure. Further, while FIGS. 3A and 3B illustrate a data storage device 300 with arm 122 coupled to heads 104A, 104B, a plurality of arms 122 (e.g., 122A or 122B of FIG. 2B) may be used in conjunction with spindle motor 306 for moving disks 102 in a vertical direction.

Data storage device 300 includes heads 104A and 104B placed between two disks, e.g., disks 102I and 102J, which will both rotate about spindle motor 306 in direction of arrow 107 when in use. However, the remaining disks 102 not in communication with heads 104A and 104B may remain stationary if so desired. In an example where disks 102 not in communication remain stationary, power consumption of device 300 may be reduced.

FIGS. 4A and 4B illustrate an embodiment of the present disclosure similar to FIGS. 3A and 3B, wherein the disks 102 coupled to spindle motor 306 may be translatable vertically along the Z axis as illustrated by arrow 217. Similar to FIG. 2B, up head 104A is coupled on actuator arm 122A facing upwards towards the bottom surface of an engaged disk, e.g., 102J, and down head 104B is coupled to actuator arm 122B facing downwards towards the top surface of the engaged disk, e.g., disk 102J. The heads 104A and 104B may be moved by actuator mechanism 210. Thus, disks 102 may translate vertically along spindle 306 to enable heads 104A, 104B to selectively engage any disk 102 to read data from and/or write data to the storage material on the bottom of disk. In one example, only one disk, e.g., 102J, is in motion and engaged by the heads 104A and 104B to allow communication with the storage material on the top and bottom of the disk 102. Data storage device 400 provides an example of an embodiment of the present disclosure when the disks 102 not engaged by the heads 104A and 104B may remain stationary to further reduce power consumption.

FIGS. 5A and 5B illustrate an embodiment of the present disclosure similar to FIGS. 2A and 2B and includes an alignment and positioning system of actuator mechanism 510. FIGS. 5A and 5B illustrates up head 104A on actuator arm 122A facing upwards towards the bottom surface of disk 102F and down head 104B on actuator arm 122B facing downwards towards the top surface of disk 102F. The heads 104A and 104B may be moved by actuator mechanism 510. Actuator arms 122A and 122B of heads 104A and 104B are coupled to an alignment system 520, e.g., pivot shaft 519, and may be translatable vertically along the Z axis as illustrated by arrow 217.

An apparatus for improving alignment and positioning of the heads may include alignment combs and a ramp load mechanism. Arms 122A and 122B may be coupled to alignment system 520 to position heads 104A, 104B with a disk, e.g., 102F of the disk stack. Alignment system 520 may include a first alignment comb 519A with protrusions and a second alignment comb 519B with corresponding receivers to translate the heads 104A and 104B vertically along the Z axis as illustrated by arrow 217 and align with the disks 102. Actuator mechanism 510, therefore, enables heads 104A and 104B to translate vertically along arrow 217 in the Z axis to any disk 102 in a disk stack as well as to rotate in cross track motion along arrow 130. A ramp load mechanism 525 may be included adjacent to the disk stack to aid in loading or unloading the heads 104A, 104B from the disks 102.

As can be seen, disk to disk space 211 provides disk separation allowing for a single head between disks 102. Although FIGS. 5A and 5B illustrate an example of a data storage device wherein the disks 102 do not move in a vertical direction on the Z axis, data storage device 500 may include vertical disk movement (e.g., spindle motor 306 of FIG. 3 or 4) with features such as actuator mechanism 510, alignment system 520, or ramp load mechanism 525.

Further, the embodiments shown illustrate devices using a single pair of up and down heads, but these illustrations are exemplary only, and a data storage device may use a plurality of up and down heads in a variety of combinations with the features described herein. For example, multiple heads 104 may be set up in a similar configuration to access different disks 102 simultaneously. Possibilities include using a plurality of actuator mechanisms, e.g., actuator mechanism 210, or a plurality of actuator arms, e.g., actuator arm 122, to support a plurality of heads 104. Multiple heads 104 may be included on the same actuators to use the same cross-stroke, e.g., along cross disk arrow 130, and vertical direction, e.g., translated vertically along the Z axis as illustrated by arrow 217. Multiple heads may also use different actuators to act independently and engage different disks, or different storage material on the same disk, simultaneously.

Actuator mechanisms may use a variety of formats to translate heads 104A and 104B vertically along the Z axis as illustrated by arrow 217. These vertical actuator formats may include, but are not limited to, magnetic lift systems, pully systems, or worm gear systems. Actuator mechanisms may also include a clutch mechanism to provide further alignment precision and to maintain the position of the heads 104. Alternatively, actuators may include an intrinsic clutch to provide alignment and stability for the heads.

FIGS. 6A and 6B illustrate an embodiment of the present disclosure using magnetic film coated foil to increase volumetric density. Similar to FIGS. 3A and 3B, data storage device includes actuator arm 122 coupled to pivot shaft 219 such that actuator mechanism 210 enables heads 104A and 104B to translate vertically along arrow 217 in the Z axis as well as to rotate in cross track motion along arrow 130. FIGS. 6A and 6B illustrate a data storage device 600 in which the data storage media are a plurality of foils 602 coated with magnetic film. A spindle motor 606 rotates the media 602 as illustrated by arrow 107 and actuator mechanism 210 positions the heads 104A and 104B relative to data tracks on the storage media 602. Heads 104A and 104B may communicate with foils 602 with magnetic film for reading data from and/or writing data to the data storage media. Foils 602 with magnetic film may provide a much thinner data storage media, as compared to disks, such as disks 102. Spindle motor 606 enables storage media 602 to translate vertically along arrow 217 in the Z axis, such that storage media 602 may increase or decrease their relative spacing, similar to disk to disk spacing 111.

As seen in FIG. 6B, heads 104A and 104B may be positioned between foils 602 to communicate with the magnetic media of a bottom portion of a foil and a top portion of a foil respectively and have a spacing 611 similar in size to disk to disk spacing 111 to accommodate the heads 104A, 104B in the vertical or Z axis. As the foils 602 are rotated by spindle motor 606, the foils 602 remain rigid, and the foils 602 not engaged by heads 104 may become closely spaced due to centrifugal force. Thus, because foils 602 with magnetic film are thinner than disks 102, and may be more closely spaced than disks 102, they may greatly increase the volumetric density of a data storage device.

Figures 7A, 7B:
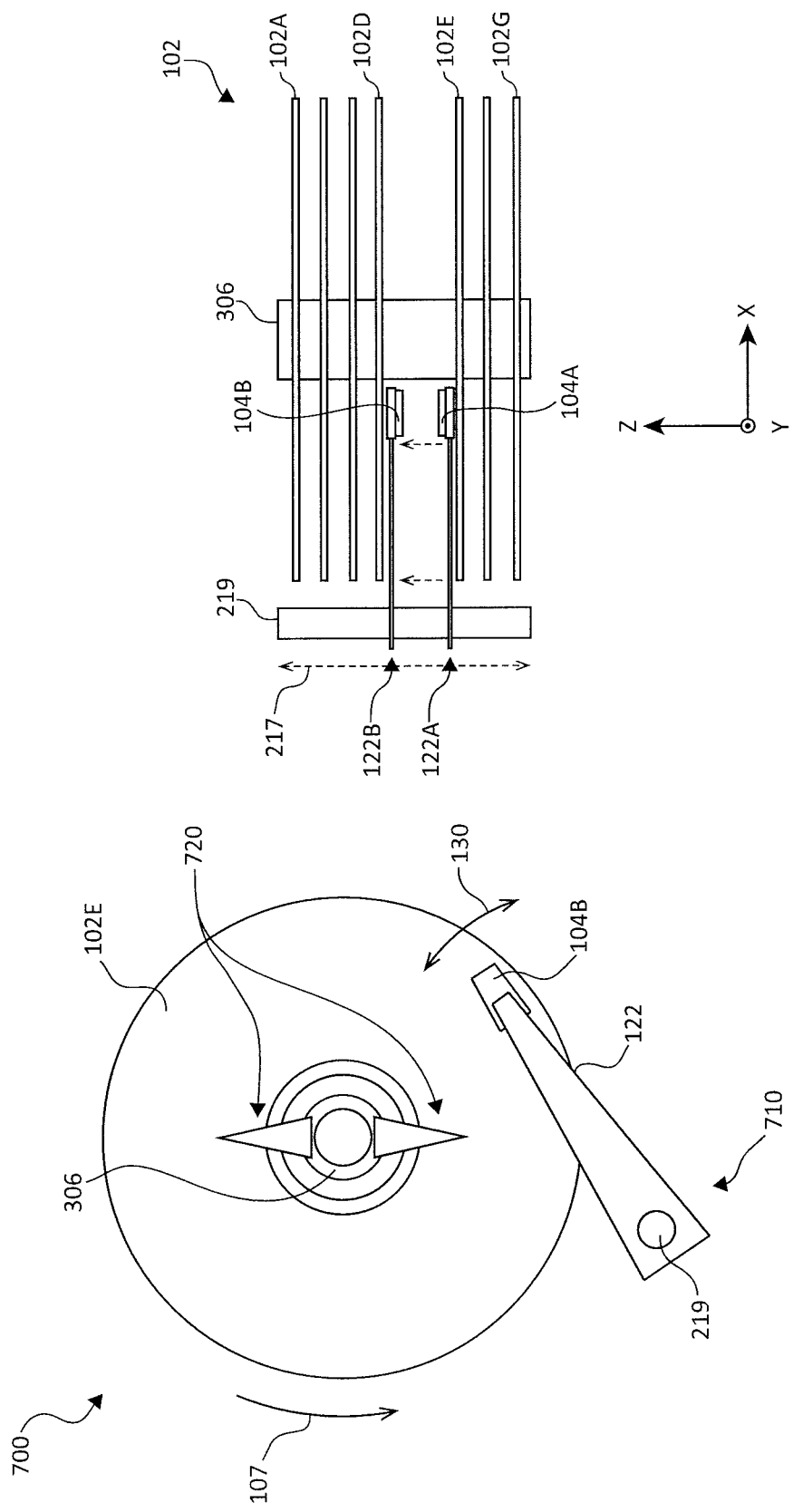
FIGS. 7A and 7B are schematic illustrations of a data storage device according to an embodiment of the disclosure.

A variety of methods may be used to translate storage media up and down in a vertical Z axis, such as by arrow 217. FIGS. 7A and 7B illustrate an embodiment of data storage device 700 using a head-based disk movement system. FIGS. 7A and B illustrate disks 102 coupled to spindle motor 306 and an actuator mechanism 710 to position the heads 104A, 104B relative to the data tracks on the disks 102. Up head 104A is coupled to actuator arm 122A and down head 104B is coupled to actuator arm 122B. Clamp system 720 is provided to keep disks 102 in place when not in translation vertically along the Z axis. As seen in FIG. 7B, a head-based disk translation system is used to move disks 102 to their respective positions, such that a head 104 may be positioned by actuator mechanism 710 to an inner diameter of disk 102 and then arm 122 may be moved or translated upwards or downwards according to arrow 217 to push the disks 102 up or down along spindle 306. For example, actuator arm 122B may be inserted between disk 102D and disk 102E and then translated upwards along pivot shaft 219 to maneuver disk 102D to its respective position on spindle 306. Once disks 102 are in place, clamp system 720 maintains the disks 102 in their respective position.

FIGS. 8A and 8B illustrate an embodiment of data storage device 800 using a spindle shaft-based disk movement system. Similar to FIGS. 7A and 7B, disks 102 are coupled to spindle motor 306 and an actuator mechanism 710 to position the heads 104A and 104B relative to the data tracks on the disks 102. Up head 104A is coupled to actuator arm 122A and down head 104B is coupled to actuator arm 122B. Clamp system 720 is provided to keep disks 102 in place when not in translation vertically along the Z axis. Spindle motor 306 is configured with an inner shaft 820 to move disks 102 into position. For example, to provide head 104 access with storage media on disks 102D and 102E, inner shaft 820 on spindle motor 306 may position disk 102D upwards and disk 102E downwards along arrow 817, and clamp system 720 may then maintain the disks 102 in their respective positions. Actuator mechanism 710 may then translate arms 122A and 122B vertically along arrow 217 in the Z axis as well as to rotate arms 122A and 122B in cross track motion along arrow 130 to position heads 104A and 104B for reading data from and/or writing data to the data storage media.

Although the various embodiments and figures illustrate storage devices with various numbers of storage media in a stack, these illustrations are exemplary only, and a data storage device may be provided with a plurality of data storage media with the ability to provide reduced disk to disk spacing according to embodiments of the disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and therefore are not drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. An apparatus comprising:
   a plurality of storage media mounted on a spindle, the plurality of storage media being configured to translate vertically on an axis of the spindle;
   a plurality of actuator arms configured to translate vertically among the plurality of storage media, each of the plurality of actuator arms being separately coupled to a pivot shaft; and
   at least one head supported on each of the plurality of actuator arms, the at least one head is configured to communicate with multiple ones of the plurality of storage media.

2. The apparatus of claim 1 and wherein the at least one actuator mechanism comprises a plurality of actuator mechanisms to position a plurality of actuator arms among the plurality of storage media.

3. The apparatus of claim 1 and further comprising an inner shaft coupled to the spindle to vertically translate the plurality of storage media.

4. The apparatus of claim 1 and further comprising a clamp system to maintain a position of the plurality of storage media on an axis of the rotatable spindle.

5. The apparatus of claim 1 and wherein the at least one actuator mechanism further comprises an alignment system including alignment combs to translate the actuator arm vertically and position the at least one head for communication with one of the plurality of storage media.

6. The apparatus of claim 1 and further comprising a ramp load mechanism to aid in loading or unloading the at least one head for communication with at least one of the plurality of storage media.

* * * * *

UNITED STATES PATENT AND TRADEMARK OFFICE
CERTIFICATE OF CORRECTION

PATENT NO. : 10,811,045 B2
APPLICATION NO. : 15/965097
DATED : October 20, 2020
INVENTOR(S) : Riyan Alex Mendonsa et al.

It is certified that error appears in the above-identified patent and that said Letters Patent is hereby corrected as shown below:

In the Claims

Column 9-10, Claim 2, Lines 18-21, please replace the language "The apparatus of claim 1 and wherein the at least one actuator mechanism comprises a plurality of actuator mechanisms to position a plurality of actuator arms among the plurality of storage media." with the language --The apparatus of claim 1 and further comprising a plurality of actuator mechanisms to position the plurality of actuator arms among the plurality of storage media.--

Signed and Sealed this
Twelfth Day of January, 2021

Andrei Iancu
*Director of the United States Patent and Trademark Office*